United States Patent
Kim et al.

(10) Patent No.: US 10,313,013 B2
(45) Date of Patent: Jun. 4, 2019

(54) ELECTRONIC APPARATUS AND METHOD OF OPERATING THE ELECTRONIC APPARATUS

(71) Applicant: SAMSUNG ELECTRONICS CO., LTD., Suwon-si (KR)

(72) Inventors: Sun-woo Kim, Suwon-si (KR); Chang-hun Bae, Yongin-si (KR); Chang-yeon Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/608,198

(22) Filed: May 30, 2017

(65) Prior Publication Data

US 2018/0034548 A1    Feb. 1, 2018

(30) Foreign Application Priority Data

Jul. 26, 2016  (KR) ........................ 10-2016-0094822

(51) Int. Cl.
*G02B 6/42* (2006.01)
*G09G 5/00* (2006.01)
(Continued)

(52) U.S. Cl.
CPC .......... *H04B 10/40* (2013.01); *G02B 6/4246* (2013.01); *G09G 5/006* (2013.01); *G09G 5/12* (2013.01);
(Continued)

(58) Field of Classification Search
None
See application file for complete search history.

(56) References Cited

U.S. PATENT DOCUMENTS 6,978,014 B1   12/2005   Bentley
7,065,604 B2    6/2006   Konda et al.
(Continued)

FOREIGN PATENT DOCUMENTS

EP         2 400 680 A1      12/2011
KR    10-2010-0045737 A       5/2010
WO       2008/119669 A1      10/2008

OTHER PUBLICATIONS

Communication issued by the International Searching Authority dated Aug. 8, 2017 in counterpart International Patent Application No. PCT/KR2017/004240 (PCT/ISA/220, PCT/ISA/210 & PCT/ISA/237).

(Continued)

*Primary Examiner* — Darren E Wolf
(74) *Attorney, Agent, or Firm* — Sughrue Mion, PLLC (57) ABSTRACT

Provided are an electronic apparatus and a method for operating the electronic apparatus. The electronic apparatus includes a power controller configured to control a supplying of power with respect to a plurality of optical fiber lines which are configured for facilitating a data transfer between the electronic apparatus and an external apparatus; and a processor configured to determine a data rate that corresponds to the data transfer between the electronic apparatus and the external apparatus, to determine a number of the optical fiber lines to be used for performing the data transfer based on the determined data rate, and to control the power controller to supply power to the determined number of the optical fiber lines.

15 Claims, 9 Drawing Sheets

(51) Int. Cl.
  *G09G 5/12* (2006.01)
  *H04B 10/25* (2013.01)
  *H04B 10/40* (2013.01)

(52) U.S. Cl.
  CPC .......... *H04B 10/25* (2013.01); *G02B 6/4284* (2013.01); *G09G 2330/021* (2013.01); *G09G 2340/00* (2013.01); *G09G 2350/00* (2013.01); *G09G 2370/18* (2013.01)

(56) References Cited

U.S. PATENT DOCUMENTS

| | | |
|---|---|---|
| 8,965,215 B2 | 2/2015 | Na et al. |
| 2007/0237462 A1 | 10/2007 | Aronson et al. |
| 2014/0327685 A1* | 11/2014 | Lee .......................... G06F 13/38 345/520 |
| 2015/0171961 A1 | 6/2015 | Featherston et al. |

OTHER PUBLICATIONS

Communication issued by the European Patent Office dated Jul. 7, 2017 in counterpart European Patent Application No. 17168757.7.

* cited by examiner

ELECTRONIC APPARATUS AND METHOD OF OPERATING THE ELECTRONIC APPARATUS

CROSS-REFERENCE TO RELATED APPLICATION

This application claims priority from Korean Patent Application No. 10-2016-0094822, filed on Jul. 26, 2016, in the Korean Intellectual Property Office, the disclosure of which is incorporated herein by reference in its entirety.

BACKGROUND

1. Field

Exemplary embodiments relate to an electronic apparatus and a method for operating the electronic apparatus, and more particularly, to an electronic apparatus that uses a data transfer device for transferring data to an external apparatus.

2. Description of the Related Art

A display apparatus such as a television (TV) receives and displays not only a broadcasting signal from a broadcasting station, but also receives and displays a plurality of items of content from various sources of supply. In order to receive the plurality of items of content from the various sources of supply, the display apparatus may have a plurality of input/output (I/O) interfaces formed at the display apparatus.

I/O interfaces for receiving the items of content from the various sources of supply may be formed at a separate external apparatus, and the external apparatus and the display apparatus may be connected to each other by using a data transfer device such as a cable. The display apparatus may receive content via the data transfer device, the content being provided via an I/O interface of the external apparatus.

Since the quality of content required by the display apparatus has increased, an amount of content received via the data transfer device has also increased. Thus, there is a need to increase an amount of data or a rate of data which is transferrable by the data transfer device that transfers content or data to the display apparatus from the external apparatus that is a content supply source.

For example, a copper cable or an optical fiber cable may be used as the data transfer device. In this regard, the copper cable or the optical fiber cable has a plurality of lines, and when an amount of data to be transferred via the data transfer device is increased, the number of lines must be increased. However, whenever any of the lines transits to an active state, power consumption is increased, and so, it is necessary to efficiently manage the lines when the number of lines is increased.

SUMMARY

Provided are an electronic apparatus and a method for operating the electronic apparatus, whereby power consumption of optical lines of an optical fiber cable can be decreased.

Additional aspects will be set forth in part in the description which follows and, in part, will be apparent from the description, or may be learned by practice of the presented exemplary embodiments.

According to an aspect of an exemplary embodiment, an electronic apparatus includes a power controller configured to control a supplying of power with respect to a plurality of optical fiber lines which are configured for facilitating a data transfer between the electronic apparatus and an external apparatus; and a processor configured to determine a data rate that corresponds to the data transfer between the electronic apparatus and the external apparatus, to determine a number of the optical fiber lines to be used for performing the data transfer based on the determined data rate, and to control the power controller to supply power to the determined number of the optical fiber lines.

The processor may be further configured to obtain first information that relates to a supply source of the data, and to determine the data rate based on the obtained information.

The processor may be further configured to determine whether to enable or disable each of the optical fiber lines based on the determined data rate.

The processor may be further configured to transmit, to the external apparatus via at least one from among the plurality of optical fiber lines, a first optical line control instruction that instructs each of the optical fiber lines with respect to whether power is to be supplied, based on the determined data rate.

The processor may be further configured to receive a second optical line control instruction from the external apparatus, and to control the power controller to control each of the optical fiber lines based on the second optical line control instruction, and the second optical line control instruction may include information that instructs each of the optical fiber lines with respect to whether power is to be supplied based on a data rate calculated by the external apparatus.

The processor may be further configured to obtain second information that relates to one from among a change of the supply source and a prediction of a change in the supply source, and to redetermine the number of optical fiber lines to be used in performing the data transfer based on the obtained second information.

According to an aspect of another exemplary embodiment, an electronic apparatus includes a power controller configured to control a supplying of power of a data transfer device including a plurality of optical fiber lines which are configured for facilitating a data transfer between the electronic apparatus and an external apparatus; and a processor configured to receive, from the external apparatus, a first optical line control instruction that instructs each of the optical fiber lines to be enabled or disabled, and to control the power controller to enable or disable each of the optical fiber lines based on the received first optical line control instruction.

The processor may be further configured to determine a data rate requested for the data transfer between the electronic apparatus and the external apparatus, and to control the power controller to determine whether to change a current state of enablement or disablement for each of the optical fiber lines, based on the determined data rate, and to enable or disable each of the optical fiber lines based on a result of the determination.

The processor may be further configured to transmit, to the external apparatus via the data transfer device, a second optical line control instruction based on a result of the determination of whether to change the current state of enablement or disablement.

According to an aspect of another exemplary embodiment, a method for operating an electronic apparatus connected to a data transfer device including a plurality of optical fiber lines which are configured for facilitating a data transfer between the electronic apparatus and an external apparatus includes determining a data rate that corresponds to the data transfer between the electronic apparatus and the external apparatus, determining a number of the optical fiber lines to be used for performing the data transfer based on the determined data rate, and controlling a power controller to supply power to the determined number of the optical fiber lines.

According to an aspect of another exemplary embodiment, a method for operating an electronic apparatus connected to a data transfer device including a plurality of optical fiber lines which are configured for facilitating a data transfer between the electronic apparatus and an external apparatus includes receiving, from the external apparatus, an optical line control instruction that instructs each of the optical fiber lines to be enabled or disabled; and enabling or disabling each of the optical fiber lines based on the received optical line control instruction.

According to an aspect of another exemplary embodiment, a non-transitory computer-readable recording medium includes a recorded program for executing a method for operating an electronic apparatus connected to a data transfer device including a plurality of optical fiber lines which are configured for facilitating a data transfer between the electronic apparatus and an external apparatus, the method including determining a data rate that corresponds to the data transfer between the electronic apparatus and the external apparatus, determining a number of the optical fiber lines to be used for performing the data transfer based on the determined data rate, and controlling a power controller to supply power to the determined number of the optical fiber lines.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings. In addition, a method for configuring and using an electronic apparatus according to exemplary embodiments will be described in detail with reference to the accompanying drawings, wherein components or elements that are the same or are in correspondence are rendered the same reference numeral.

While terms such as "first" and "second" are used to describe various components, it is apparent that the components are not limited to the terms "first" and "second". The terms "first" and "second" are used only to distinguish between each of components. For example, a first component may indicate a second component without conflicting with the present disclosure, or vice versa. As used herein, the term "and/or" includes any and all combinations of one or more of the associated listed items.

Furthermore, all examples and conditional language recited herein are to be construed as being without limitation and/or restriction to such specifically recited examples and conditions. Throughout the specification, a singular form may include plural forms, unless there is a particular description contrary thereto. Also, terms such as "includes" or "comprises" are used to specify existence of a recited form, a number, a process, an operations, a component, and/or groups thereof, not excluding the existence of one or more other recited forms, one or more other numbers, one or more other processes, one or more other operations, one or more other components and/or groups thereof.

Hereinafter, exemplary embodiments will be described in detail with reference to the accompanying drawings.

Figure 1:
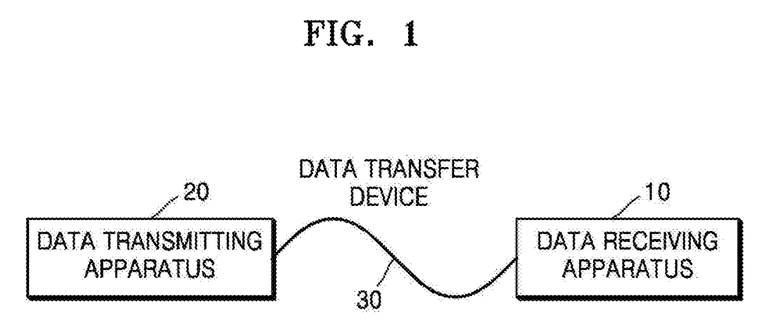
FIG. 1 is a diagram for describing data transfer in a system, according to various exemplary embodiments.

FIG. 1 is a diagram for describing data transfer in a system, according to various exemplary embodiments.

Referring to FIG. 1, a system according to various exemplary embodiments includes a data receiving apparatus 10, a data transmitting apparatus 20, and a data transfer device 30.

The data receiving apparatus 10 may receive data from the data transmitting apparatus 20 via the data transfer device 30, and may display or reproduce the received data. The data receiving apparatus 10 may include a connecting part to be connected to the data transfer device 30. The data receiving apparatus 10 may include a multimedia reproducing apparatus, such as, for example, a television (TV).

The data transmitting apparatus 20 may transmit data to the data receiving apparatus 10 via the data transfer device 30, in response to a request from the data receiving apparatus 10 or based on a determination by the data transmitting apparatus 20. The data transmitting apparatus 20 may include a connecting part to be connected to the data transfer device 30. The data transmitting apparatus 20 may include a multimedia supplying apparatus, such as, for example, a data box.

The data transfer device 30 may transfer data received from the data transmitting apparatus 20 to the data receiving apparatus 10. The data transfer device 30 may include a connecting part for connection to the data transmitting apparatus 20 and another connecting part for connection to the data receiving apparatus 10. The data transfer device 30 may include an optical fiber cable.

The data transfer device 30 may include a plurality of lines which are configured to transport data and/or to facilitate a transfer of data. Each of the lines may transport a constant amount of data, and may be enabled or disabled. According to a transport target amount of data, the data transfer device 30 may enable lines that correspond to the transport target amount of data, and may disable other lines except for the enabled lines.

The data receiving apparatus 10 may determine an amount of data to be received via the data transfer device 30, and may control the data transfer device 30 to disable some lines from among the plurality of lines of the data transfer device 30, based on the determined amount of data. In addition, the data receiving apparatus 10 may transmit an instruction to cause the data transmitting apparatus 20 to disable some lines to the data transmitting apparatus 20 via the data transfer device 30.

The data transmitting apparatus 20 may receive the instruction to cause the data transmitting apparatus 20 to disable some lines of the data transfer device 30 from the data receiving apparatus 10 via the data transfer device 30, and may control, based on the received instruction, the data transfer device 30 to disable some lines of the data transfer device 30.

According to an exemplary embodiment, an amount of data to be transferred via the data transfer device 30 may be determined by the data receiving apparatus 10, the data transmitting apparatus 20, or both the data transmitting apparatus 20 and the data receiving apparatus 10.

In the present specification, the data transmitting apparatus 20 and the data receiving apparatus 10 may each be referred to as an electronic apparatus, and an apparatus that is disposed on the outside of the electronic apparatus may be referred to as an external apparatus.

In the present specification, the data transfer device 30 includes the lines which are configured for transferring data, and each of the lines may be enabled or disabled. Instead of terms 'enable' and 'disable', the terms 'power on' and 'power off' may be used with respect to each line.

Figure 2:
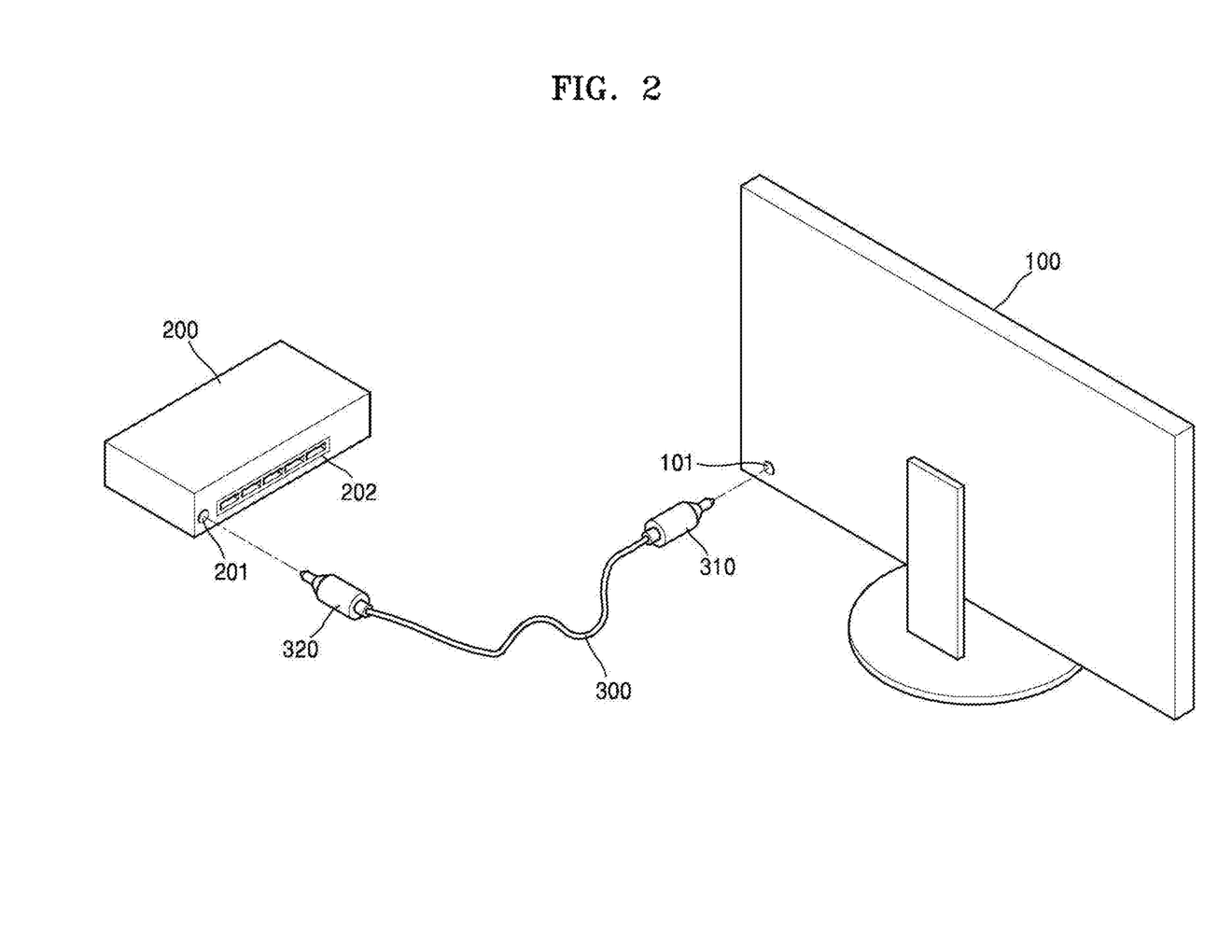
FIG. 2 is a diagram for describing data transfer between an image supplying apparatus and a display apparatus, according to an exemplary embodiment.

FIG. 2 is a diagram for describing data transfer between an image supplying apparatus 200 and a display apparatus 100, according to an exemplary embodiment.

Referring to FIG. 2, the display apparatus 100 is illustrated as an example of the data receiving apparatus 10, the image supplying apparatus 200 is illustrated as an example of the data transmitting apparatus 20, and an optical fiber cable 300 is illustrated as an example of the data transfer device 30.

The display apparatus 100 may be embodied as a TV which is configured to display a broadcasting image based on a broadcasting signal, broadcasting information, or broadcasting data received from a transmitting apparatus of a broadcasting station. The display apparatus 100 may display not only a TV signal but may also display images, such as a moving picture, based on signals or data having various image-displayable formats, a still image, an application, an on-screen display (OSD), a graphical user interface (GUI) for controlling various operations, or the like. The display apparatus 100 may have a port 101 configured for providing a physical and electrical connection to the optical fiber cable 300.

The image supplying apparatus 200 may be manufactured to be portable so as to be easily carried and replaced, and may transmit data from various sources of supply to the display apparatus 100 via the optical fiber cable 300. The image supplying apparatus 200 may have an optical fiber cable port 201 configured for providing a physical and electrical connection to the optical fiber cable 300. In addition to the optical fiber cable port 201, the image supplying apparatus 200 may also have one or more input/output (I/O) ports 202 configured for receiving data from various image sources of supply.

The optical fiber cable 300 may have a connector 310 configured for providing a physical and electrical connection to the display apparatus 100, and a connector 320 configured for providing a physical and electrical connection to the image supplying apparatus 200. The optical fiber cable 300 may receive data from the image supplying apparatus 200 via the connector 320, and may transmit the received data to the display apparatus 100 via the connector 310. The optical fiber cable 300 may include a plurality of optical lines configured for facilitating data transmission.

The display apparatus 100 may determine an amount of data to be transferred via the optical fiber cable 300, and may control the connector 310 of the optical fiber cable 300 to enable optical lines in correspondence with the determined amount of data and to disable other optical lines. In addition, the display apparatus 100 may transmit an optical line control instruction to the image supplying apparatus 200 to enable optical lines in correspondence the determined number of optical lines and to disable other optical lines. The display apparatus 100 may receive an optical line control instruction from the image supplying apparatus 200, and may control the connector 310 based on the received optical line control instruction.

The image supplying apparatus 200 may determine an amount of data to be transferred via the optical fiber cable 300, and may control the connector 320 of the optical fiber cable 300 to enable optical lines in correspondence with the determined amount of data and to disable remaining optical lines. In addition, the image supplying apparatus 200 may transmit an optical line control instruction to the display apparatus 100 to enable optical lines in correspondence with the determined number of optical lines and to disable other optical lines. The image supplying apparatus 200 may receive an optical line control instruction from the display apparatus 100, and may control the connector 320 based on the received optical line control instruction.

Figure 3:
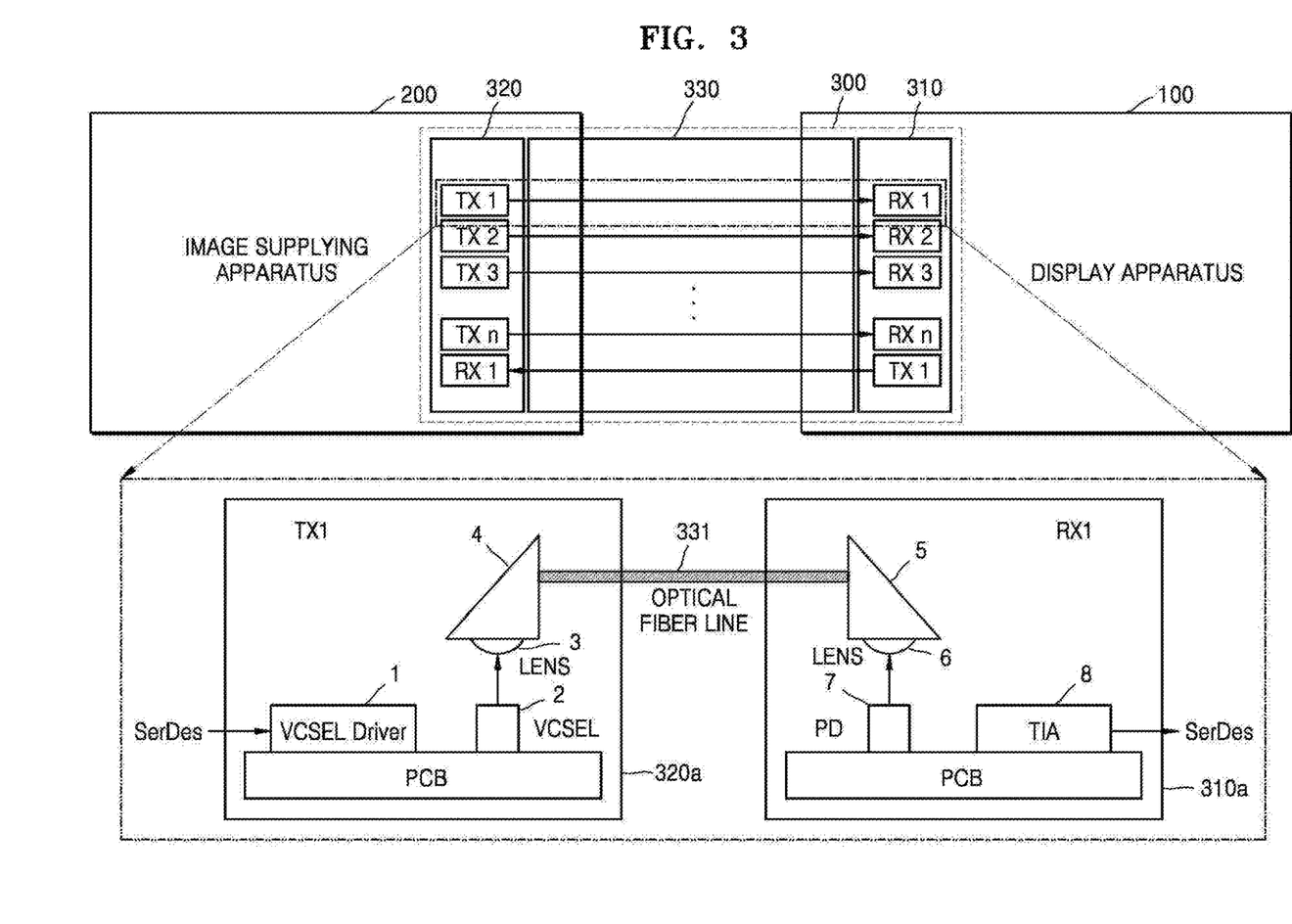
FIG. 3 is a diagram for describing a detailed configuration of an optical fiber cable, according to an exemplary embodiment.

FIG. 3 is a diagram for describing a detailed configuration of the optical fiber cable 300, according to an exemplary embodiment.

Referring to FIG. 3, the optical fiber cable 300 consists of the connector 310 configured for providing a connection to the display apparatus 100, the connector 320 configured for providing a connection to the image supplying apparatus 200, and a plurality of optical fiber lines 330.

The connector 320 may include transmission modules TX1 through TXn which are configured to receive data from the image supplying apparatus 200 and to transmit the data by using one or more optical fiber lines 330, and a receiving module RX1 configured to receive data from the display apparatus 100. The transmission modules TX1 through TXn may be used to transmit data, and at least one of the transmission modules TX1 through TXn and the receiving module RX1 may be respectively used to transmit and receive a control signal.

The connector 310 may include receiving modules RX1 through RXn which are configured to receive data via one or more optical fiber lines 330 and to transmit the data to the display apparatus 100, and a transmission module TX1 configured to transmit data to the image supplying apparatus 200. The receiving modules RX1 through RXn may be used to receive data, and at least one of the receiving modules RX1 through RXn and the transmission module TX1 may be respectively used to receive and transmit a control signal.

Each of the optical fiber lines 330 of the optical fiber cable 300 may be enabled or disabled by the control of the image supplying apparatus 200. In particular, the image supplying apparatus 200 may control the connector 320 to enable or disable each of the transmission modules TX1 through TXn of the connector 320. In addition, the image supplying apparatus 200 may transmit an optical line control instruction to the display apparatus 100 via one of the transmission modules TX1 through TXn of the connector 320, or may receive an optical line control instruction from the display apparatus 100 via the receiving module RX1 of the connector 320.

Each of the optical fiber lines 330 of the optical fiber cable 300 may be enabled or disabled by the control of the display apparatus 100. In particular, the display apparatus 100 may control the connector 310 to enable or disable each of the receiving modules RX1 through RXn of the connector 310. In addition, the display apparatus 100 may receive an optical line control instruction from the image supplying apparatus 200 via one of the receiving modules RX1 through RXn of the connector 310, or may transmit an optical line control instruction to the image supplying apparatus 200 via the transmission module TX1 of the connector 310.

For example, for an exchange of a control signal that includes an optical line control instruction, at least two designated optical fiber lines, i.e., one transmission module TX and one receiving module RX, may not be disabled but may instead be constantly enabled. For example, the image supplying apparatus 200 or the display apparatus 100 may determine to enable or disable a plurality of optical fiber lines, and cannot determine to enable or disable the at least two designated optical fiber lines for the exchange of the control signal.

Hereinafter, a detailed configuration of an optical fiber line connected between TX and RX will be described below.

A transmission module TX1 320a may include a vertical cavity surface-emitting laser (VCSEL) driver 1, a VCSEL 2, a lens 3, and a prism 4 which are arranged on a printed circuit board (PCB).

The VCSEL driver 1 is a circuit that is configured to control and drive one or more VCSELs by receiving data from a Serializer/Deserializer (SerDes).

The VCSEL driver 1 may enable or disable a corresponding VCSEL by the control of the image supplying apparatus 200.

The VCSEL 2 is a laser diode that is configured to convert an electrical signal received from the VCSEL driver 1 to an optical signal.

The lens 3 conveys light received from the VCSEL 2 to the prism 4, and the prism 4 reflects the received light to an optical fiber line 331.

The optical fiber line 331 may transmit the received light to a receiving module RX1 310a.

The receiving module RX1 310a may include a prism 5, a lens 6, and a photo-detector (PD) 7 and a transimpedance amplifier (TIA) 8, which are arranged on a PCB.

The prism 5 may transmit the light received from the optical fiber line 331 to the PD 7 via the lens 6.

The PD 7 may convert the received light into an electrical signal and may transmit the electrical signal to the TIA 8.

The TIA 8 is an amplifier that is configured to convert current to a voltage, and may amplify the electrical signal received from the PD 7 and may transmit the amplified electrical signal to the SerDes.

The TIA 8 may enable or disable the PD 7 by the control of the display apparatus 100.

Referring to FIG. 3, each transmission module includes a VCSEL driver and a VCSEL, and each receiving module includes a PD and a TIA. However, as illustrated in FIG. 4, one VCSEL driver may be configured to control a plurality of VCSELs, and one TIA may be configured to control a plurality of PDs.

Figure 4:
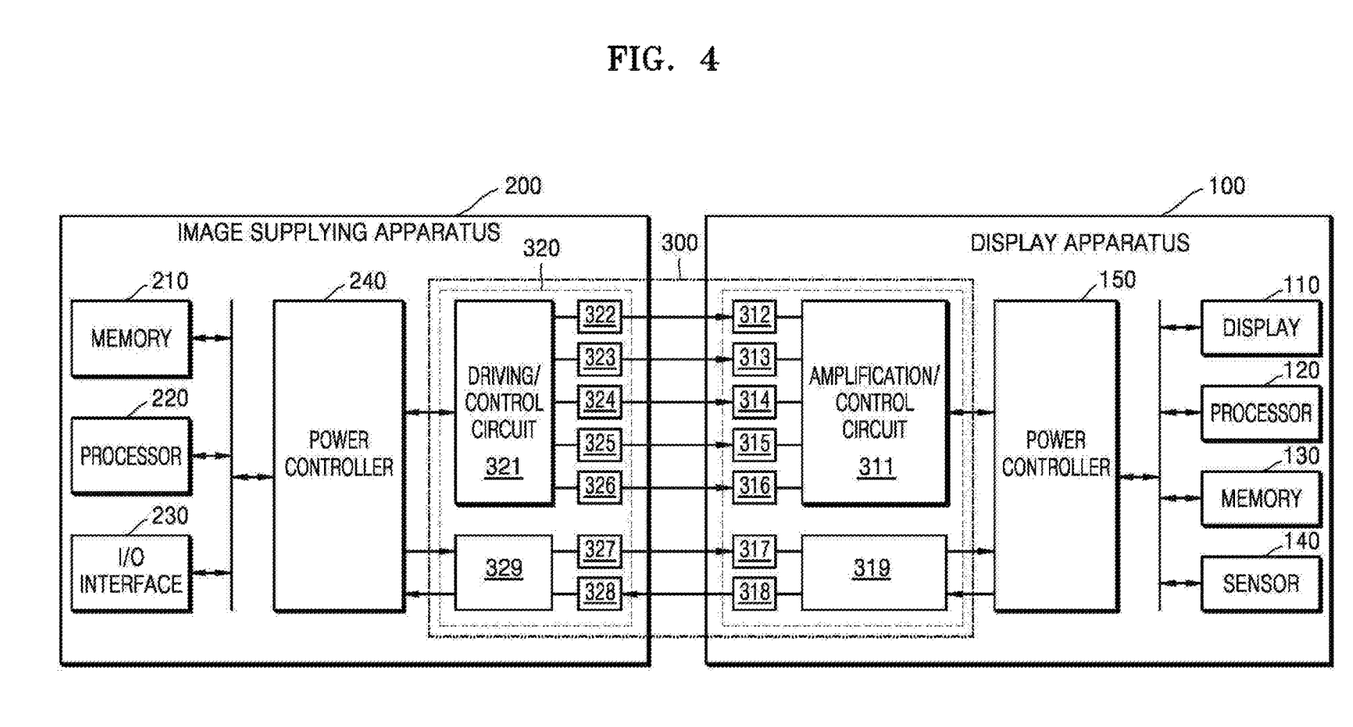
FIG. 4 is a diagram for describing an operation that uses configurations of the display apparatus, the optical fiber cable, and the image supplying apparatus, according to an exemplary embodiment.

FIG. 4 is a diagram for describing an operation that uses configurations of the display apparatus 100, the optical fiber cable 300, and the image supplying apparatus 200, according to an exemplary embodiment.

Referring to FIG. 4, the connector 310 of the optical fiber cable 300 may include an amplification/control circuit 311, a plurality of optical-electrical conversion modules 312, 313, 314, 315, 316, and 317, an electrical-optical conversion module 318, and a control signal processing circuit 319.

The optical-electric conversion modules 312, 313, 314, 315, 316, and 317 may include devices such as a lens, a photo-detector, etc., and may be configured to convert light received from an optical fiber line to an electrical signal.

The amplification/control circuit 311 amplifies the electrical signal received from the optical-electrical conversion modules 312, 313, 314, 315, and 316 and transmits the amplified electrical signal to the display apparatus 100, and may enable or disable one or more of the optical-electrical conversion modules 312, 313, 314, 315, and 316 by the control of the display apparatus 100.

The optical-electrical conversion module 317 may be used to receive a control signal from the image supplying apparatus 200, and the optical-electrical conversion module 318 may be used to transmit a control signal from the display apparatus 100 to the image supplying apparatus 200.

The control signal processing circuit 319 may be configured to control the optical-electrical conversion module 317 and the optical-electrical conversion module 318.

The control signal processing circuit 319 may control the optical-electrical conversion module 318 to receive an optical line control instruction from the display apparatus 100 and to transmit the optical line control instruction to the image supplying apparatus 200, and may receive an optical line control instruction from the image supplying apparatus 200 via the optical-electrical conversion module 317 and may transmit the optical line control instruction to the display apparatus 100. The optical line control instruction is an instruction for enabling or disabling one or more optical fiber lines from among a plurality of optical fiber lines used in data transmission.

The connector 320 of the optical fiber cable 300 may include a driving/control circuit 321, a plurality of electric-optical conversion modules 322, 323, 324, 325, 326, and 327, an optical-electrical conversion module 328, and a control signal processing circuit 329.

The electric-optical conversion modules 322, 323, 324, 325, 326, and 327 may include devices such as a lens, a laser, etc., and may convert an electrical signal to an optical signal and may transmit the optical signal to optical fiber lines.

The driving/control circuit 321 may transfer a signal received from the image supplying apparatus 200 to the electric-optical conversion modules 322, 323, 324, 325, and 326, and may enable or disable one or more modules of the electric-optical conversion modules 322, 323, 324, 325, and 326 by the control of the image supplying apparatus 200.

The electric-optical conversion module 327 may be used to transfer a control signal from the image supplying apparatus 200 to the optical fiber lines, and the optical-electrical conversion module 328 may be used to transmit a control signal from the display apparatus 100 to the image supplying apparatus 200.

The control signal processing circuit 329 may be configured to control both the electric-optical conversion module 327 and the optical-electrical conversion module 328.

The control signal processing circuit 329 may control the electric-optical conversion module 327 to receive an optical line control instruction from the image supplying apparatus 200 and to transfer the optical line control instruction to the display apparatus 100, and may receive an optical line control instruction from the display apparatus 100 via the optical-electrical conversion module 328 and may transmit the optical line control instruction to the image supplying apparatus 200. The optical line control instruction is an instruction for enabling or disabling one or more optical fiber lines from among a plurality of optical fiber lines used in data transmission.

The display apparatus 100 may include a display 110, a processor 120, a memory 130, a sensor 140, and a power controller 150.

The display 110 may be configured to display an image processed by the processor 120 or stored in the memory 130.

The processor 120 may be configured to control all elements of the display apparatus 100, and may perform at least one operation by executing at least one instruction stored in the memory 130.

The processor 120 may determine a rate of data to be transferred via the optical fiber cable 300 from an image source of supply in the display apparatus 100 selected by the user or a pre-defined image source of supply. For example, the user may select the image source of supply by selecting a TV broadcasting signal or a universal serial bus (USB). Alternatively, the display apparatus 100 may previously store information that relates to the pre-defined image source of supply. For example, according to a reproduction reservation by which a particular broadcasting signal is to be received at a particular time, an image source of supply may be determined based on pre-set information, without a user input of selecting a current image source of supply.

The processor 120 may determine an amount or rate of data to be transferred via the optical fiber cable 300, based on the selected or determined image source of supply. For example, the processor 120 may determine a maximum data rate that corresponds to the determined image source of supply. A requested data rate varies according to image sources of supply. For example, USB 2.0 may request a data rate of 480 megabits per second (Mbps), high-definition multimedia interface (HDMI) 2.0 may request a data rate of 18 gigabits per second (Gbps), high-definition (HD) broadcasting may request a data rate of 5 Gbps, and ultra high-definition (UHD) broadcasting may request a data rate of 20 Gbps.

The processor 120 may determine the number of optical fiber lines requested based on the data rate determined according to the image source of supply. For example, it may be assumed that a transmission speed of each of optical fiber lines included in the optical fiber cable 300 is 10 Gbps. If the user selects USB 2.0, only one optical fiber line may be sufficient to transfer data, thus, the power controller 150 may enable only one of the optical fiber lines, and may disable the other optical fiber lines. In this aspect, the power controller 150 may transmit a control signal to the amplification/control circuit 311 of the optical fiber cable 300 so as to control the amplification/control circuit 311 to enable one optical fiber line and disable the other optical fiber lines, and when the amplification/control circuit 311 receives the control signal, the amplification/control circuit 311 may enable only one optical-electrical conversion module and may disable other optical-electrical conversion modules.

The processor 120 may transmit an optical line control instruction that involves enabling one optical fiber line and disabling the other optical fiber lines to the control signal processing circuit 319 of the optical fiber cable 300. When the control signal processing circuit 319 receives the optical line control instruction, the control signal processing circuit 319 may transmit the optical line control instruction to the image supplying apparatus 200 via the optical-electrical conversion module 318.

In addition, the processor 120 may receive an optical line control instruction from the image supplying apparatus 200 via the optical fiber cable 300. The processor 120 may transmit an enable or disable control signal with respect to optical fiber lines to the amplification/control circuit 311, based on the optical line control instruction received from the image supplying apparatus 200.

The memory 130 may store various items, including any one or more of setting data, program data including at least one instruction, application data, an operating system, or the like.

The sensor 140 indicates a part that is configured to sense a user input, and may sense sources of various images selected by the user. For example, the sensor 140 may include any one or more of an infrared (IR) receiver, a Bluetooth (BT) module, a physical key, etc., and may sense a source of supply such as a radio frequency (RF) broadcasting signal, a USB, an HDMI, a local area network (LAN), etc., selected by the user.

The power controller 150 indicates a circuit that is configured to interact with the optical fiber cable 300 and to control power of the optical fiber cable 300, and may be embodied as a micro-computer.

The power controller 150 may control an exchange of data and a control signal between the power controller 150 and the optical fiber cable 300.

The power controller 150 may control each of the optical fiber lines of the optical fiber cable 300 to be enabled or disabled by the control of the processor 120.

As described above, the display apparatus 100 may determine an on or off status with respect to the optical fiber lines of the optical fiber cable 300, based on a rate of data to be transferred via the optical fiber cable 300, or may control the on or off status with respect to the optical fiber lines, based on the optical line control instruction from the image supplying apparatus 200.

The image supplying apparatus 200 may include a memory 210, a processor 220, an I/O interface 230, and a power controller 240.

The memory 210 may store various items, including any one or more of setting data, program data including at least one instruction, application data, an operating system, or the like.

The processor 220 may control all elements of the image supplying apparatus 200, and may perform at least one operation by executing at least one instruction stored in the memory 210.

The processor 220 may determine a rate of data to be transferred via the optical fiber cable 300 from an image source of supply in the image supplying apparatus 200 selected by the user, a pre-defined image source of supply, or an image source of supply sensed via the I/O interface 230. For example, when it is sensed that an HDMI cable is inserted into an HDMI interface of the I/O interface 230, the processor 220 may predict that an HDMI will be used as an image source of supply.

The processor 220 may determine an amount or rate of data to be transferred via the optical fiber cable 300 based on the selected, determined, or predicted image source of supply. For example, the processor 220 may determine a maximum data rate that is permissible with respect to the determined image source of supply.

The processor 220 may determine the requested number of optical fiber lines based on the data rate determined in accordance with the image source of supply. The determining of the requested number of optical fiber lines based on the data rate is the same as an operation performed by the processor 120 of the display apparatus 100. The processor 220 may enable only one of the optical fiber lines and may disable the other optical fiber lines. In particular, the processor 220 may transmit a control signal that relates to enabling one optical fiber line and disabling the other optical fiber lines to the driving/control circuit 321 of the optical fiber cable 300, and when the driving/control circuit 321 receives the control signal, the driving/control circuit 321 may enable only one electric-optical conversion module and may disable the other electric-optical conversion modules, based on the received control signal.

The processor 220 may transmit an optical line control instruction that entails enabling one optical fiber line and disabling the other optical fiber lines to the control signal processing circuit 329 of the optical fiber cable 300. When the control signal processing circuit 329 receives the optical line control instruction, the control signal processing circuit 329 may transmit the optical line control instruction to the display apparatus 100 via the electric-optical conversion module 327.

In addition, the processor 220 may receive an optical line control instruction from the display apparatus 100 via the optical fiber cable 300. In accordance with the optical line control instruction received from the display apparatus 100, the processor 220 may transmit an enable or disable control signal with respect to optical fiber lines to the driving/control circuit 321.

The I/O interface 230 is a terminal via which at least one image source of supply can be selected. For example, the I/O interface 230 may include any one or more of an HDMI interface, a USB interface, a LAN interface, a tuner, or the like.

The power controller 240 indicates a dedicated processor configured to control interaction with the optical fiber cable 300, and may be embodied as a micro-computer.

The power controller 240 may be configured to control an exchange of data and a control signal between the power controller 240 and the optical fiber cable 300.

The power controller 240 may be configured to control each of the optical fiber lines of the optical fiber cable 300 to be enabled or disabled by the control of the processor 220.

In this manner, the image supplying apparatus 200 may determine an on or off status with respect to each of the optical fiber lines of the optical fiber cable 300, based on a rate of data to be transferred via the optical fiber cable 300, or may control the on or off status with respect to each of the optical fiber lines, based on the optical line control instruction from the display apparatus 100.

In addition, the image supplying apparatus 200 may control the optical fiber lines of the optical fiber cable 300 based on the optical line control instruction from the display apparatus 100, and may further control the optical fiber lines by performing a self-monitoring operation with respect to the rate of transferred data. In particular, after the image supplying apparatus 200 receives an optical line control instruction that involves to enabling two optical fiber lines and disabling three other optical fiber lines from the display apparatus 100 and then controls an optical fiber cable, the image supplying apparatus 200 may monitor supplied data, and then may determine that it is sufficient to enable only one optical fiber line. In this regard, the image supplying apparatus 200 may additionally disable one optical fiber line, and may transmit an optical line control instruction that relates to additionally disabling one optical fiber line to the display apparatus 100. Conversely, the image supplying apparatus 200 may monitor a data rate and thus may determine that one optical fiber line is additionally needed. In this regard, the image supplying apparatus 200 may additionally enable one optical fiber line, and may transmit an optical line control instruction that entails additionally enabling one optical fiber line to the display apparatus 100.

Figure 5:
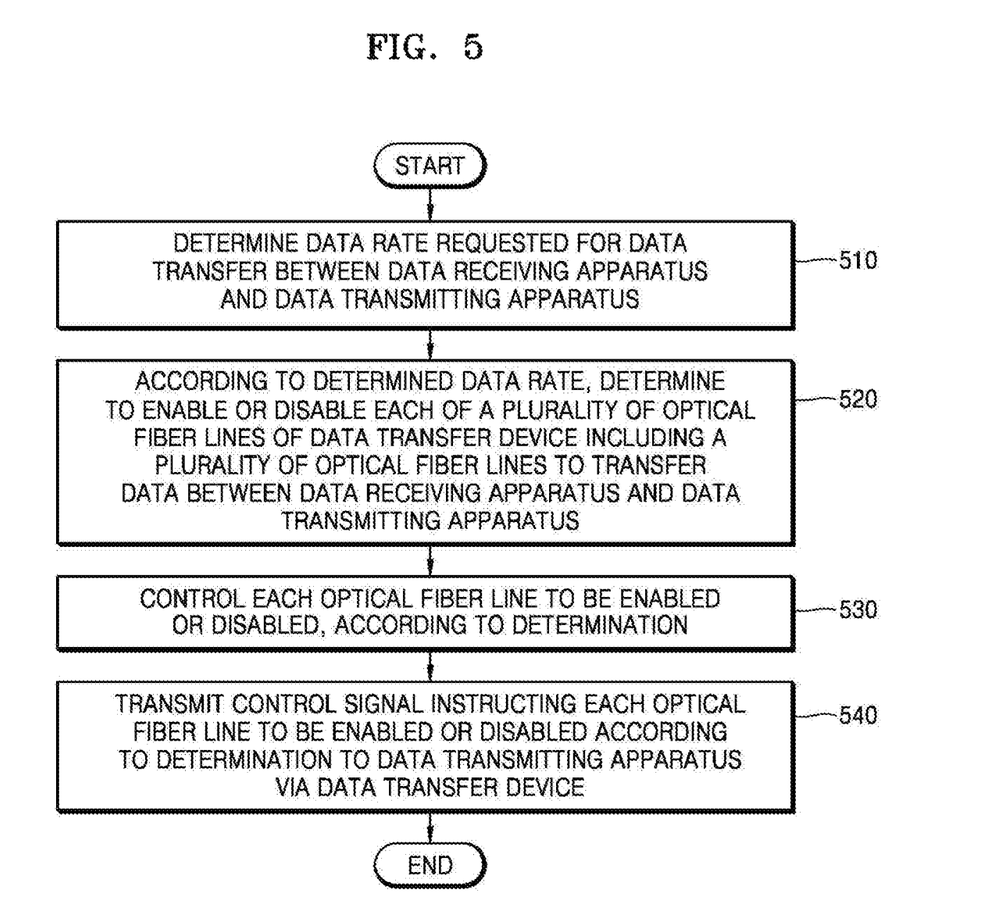
FIG. 5 is a flowchart of operations between a data transmitting apparatus and a data receiving apparatus, according to an exemplary embodiment.

FIG. 5 is a flowchart of operations between a data transmitting apparatus and a data receiving apparatus, according to an exemplary embodiment.

Referring to FIG. 5, in operation 510, the data receiving apparatus may determine a data rate requested for data transfer between the data transmitting apparatus and the data receiving apparatus. The data transfer between the data transmitting apparatus and the data receiving apparatus is performed via a data transfer device, and the data transfer device may include a plurality of optical fiber lines. Each of the optical fiber lines may transfer a constant amount of data, i.e., each of the optical fiber lines may employ a constant data rate.

In operation 520, the data receiving apparatus may determine, from among the optical fiber lines of the data transfer device, the number of optical fiber lines that are needed for transferring data, based on the determined data rate. Accordingly, the data receiving apparatus may determine, from among the optical fiber lines, at least one optical fiber line to be enabled and at least one optical fiber line to be disabled.

In operation 530, the data receiving apparatus may control each of the optical fiber lines of the data transfer device to be enabled or disabled, as a result of the determination made in operation 520.

In operation 540, the data receiving apparatus may transmit a control signal that instructs each optical fiber line to be enabled or disabled to the data transmitting apparatus via the data transfer device.

Referring to FIG. 5, it is described that the data receiving apparatus determines whether each of the optical fiber lines of the data transfer device is to be enabled or disabled. However, the determining with respect to enabling or disabling the optical fiber lines of the data transfer device may be performed by the data transmitting apparatus or by both the data transmitting apparatus and the data receiving apparatus.

After the data receiving apparatus determines whether each of the optical fiber lines of the data transfer device is to be enabled or disabled, the data transmitting apparatus that monitored an actual status of data transfer may determine at least one optical fiber line to be additionally enabled or disabled.

While data is being transferred between the data transmitting apparatus and the data receiving apparatus, when an event of a new data source of supply occurs in the data transmitting apparatus, the data transmitting apparatus may adaptively determine at least one optical fiber line of the data transfer device to be enabled or disabled.

While data is being transferred between the data transmitting apparatus and the data receiving apparatus, when the data receiving apparatus senses a user selection of a new data source of supply, the data receiving apparatus may redetermine a required amount of a data rate based on the new data source of supply selected by a user, and may determine at least one optical fiber line of the data transfer device to be enabled or disabled, based on the redetermined data rate.

Figure 6A:
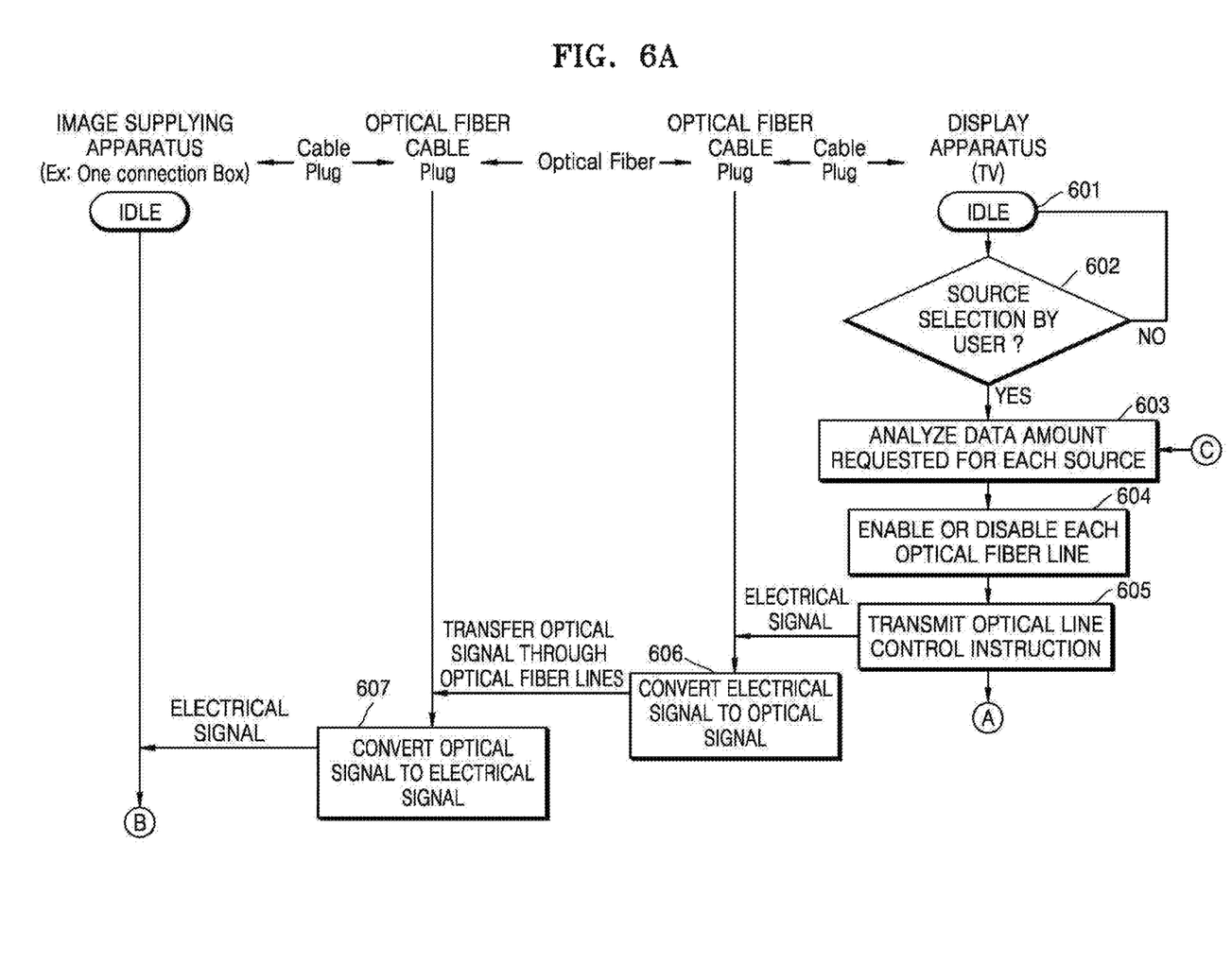
FIGS. 6A and 6B are flowcharts of operations of controlling optical fiber lines of an optical fiber cable between a display apparatus and an image supplying apparatus, according to an exemplary embodiment.
Figure 6B:
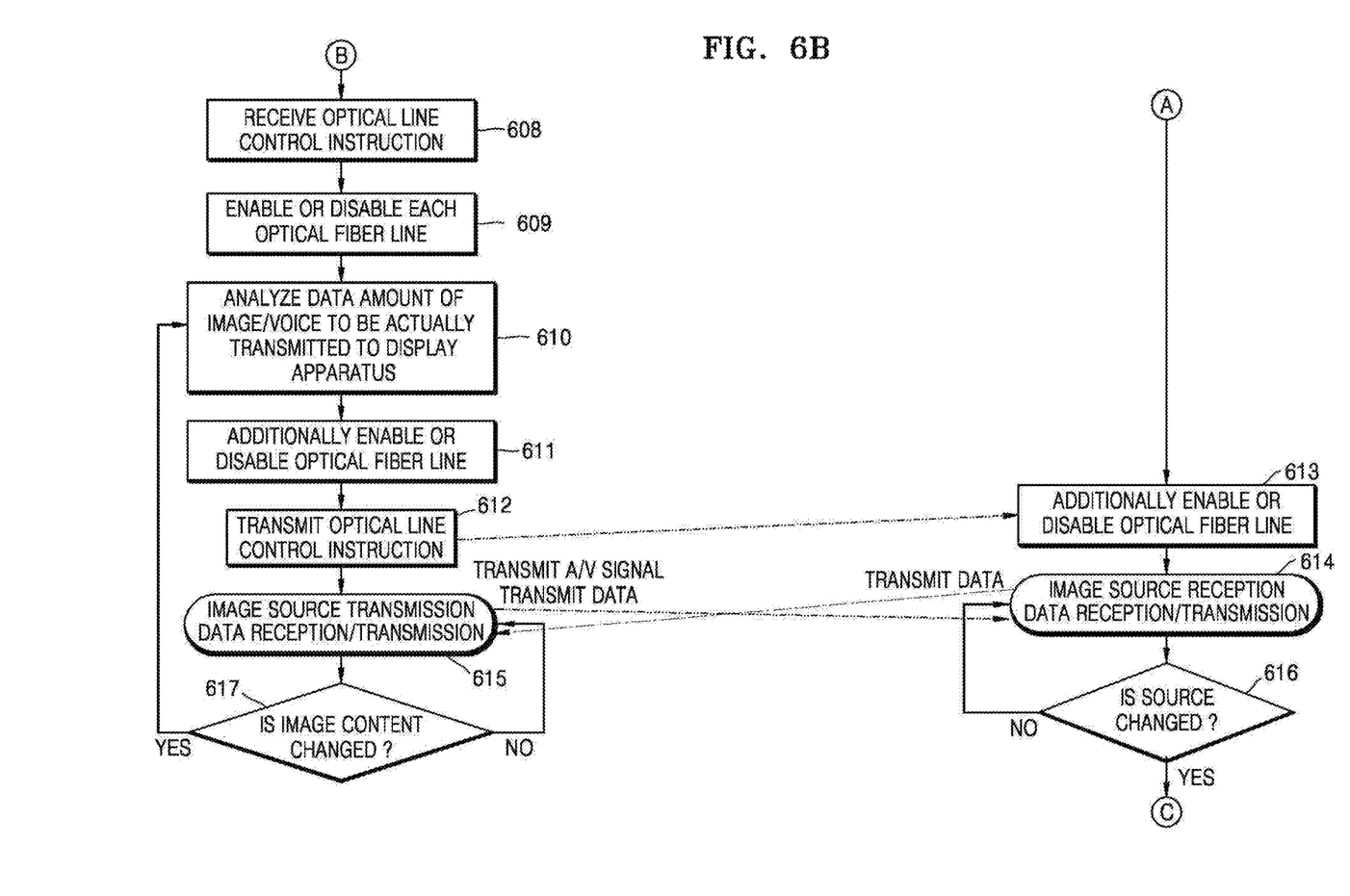

FIGS. 6A and 6B are flowcharts of operations of controlling optical fiber lines of an optical fiber cable between a display apparatus and an image supplying apparatus, according to an exemplary embodiment.

Referring to FIG. 6A, in operation 601, the display apparatus is in an idle state. The idle state may indicate a low-power mode of the display apparatus, in which the display apparatus waits for an input from a user while consuming a minimum amount of power.

In operation 602, the display apparatus may determine an existence of a source selection input by the user. When the existence of the source selection is not present, the display apparatus may maintain the idle state, and when the existence of the source selection is present, the display apparatus may proceed to operation 603.

In operation 603, the display apparatus may analyze a data amount requested for the selected source, and may determine to enable or disable each of the optical fiber lines of the optical fiber cable, based on the analyzed data rate.

When one optical fiber line is sufficient for transferring data at a data rate requested for the selected source, the display apparatus may determine to enable only one optical fiber line from among the optical fiber lines and to disable the other optical fiber lines. For example, when an optical fiber cable includes 10 optical fiber lines that are configured to transfer data, the display apparatus may determine to enable first and second optical fiber lines and to disable third through tenth optical fiber lines.

The optical fiber cable may include an optical fiber line configured to transfer data and an optical fiber line configured to transfer a control signal. In this regard, since the optical fiber line configured to transfer a control signal functions as a communication channel for controlling a data transfer between the display apparatus and the image supplying apparatus, the optical fiber line configured to transfer a control signal must be constantly enabled. Therefore, an optical fiber line for which an enable or disable status is determined by the display apparatus is limited to the optical fiber line configured to transfer data, and whether to enable or disable the optical fiber line to transfer a control signal cannot be determined by the display apparatus or the image supplying apparatus, and the optical fiber line configured to transfer a control signal must be constantly enabled.

In operation 604, the display apparatus may enable or disable each optical fiber line of the optical fiber cable, based on a result of the determination in operation 603.

In operation 605, the display apparatus may output, to a plug of the optical fiber cable, an optical line control instruction that relates to enabling or disabling each optical fiber line based on the result of the determination in operation 603. For example, the optical line control instruction may be <enable first and second optical fiber lines, disable third through tenth optical fiber lines>.

In operation 606, the plug of the optical fiber cable may convert the optical line control instruction, which is received in the form of an electrical signal, into an optical signal. The converted optical signal may be transferred to the other plug of the optical fiber cable via at least one optical fiber line.

In operation 607, the other plug of the optical fiber cable may convert the received optical signal into an electrical signal, and may output the converted electrical signal, i.e., the optical line control instruction, to the image supplying apparatus.

Referring to FIG. 6B, in operation 608, the image supplying apparatus may receive the optical line control instruction, and in operation 609, the image supplying apparatus may enable or disable each of the optical fiber lines of the optical fiber cable based on the received optical line control instruction. For example, when the received optical line control instruction indicates <enable first and second optical fiber lines, disable third through tenth optical fiber lines>, the image supplying apparatus may enable first and second optical fiber lines and may disable third through tenth optical fiber lines, in accordance with the optical line control instruction.

In operation 610, the image supplying apparatus may further analyze a data amount of an image or voice signal to be actually transferred from the image supplying apparatus to the display apparatus.

In operation 611, the image supplying apparatus may additionally enable or disable at least one optical fiber line, based on the analyzed data amount from operation 610.

In operation 612, when the image supplying apparatus determines that one optical fiber line can be additionally disabled, the image supplying apparatus may transmit an optical line control instruction that corresponds to the determination to the display apparatus. For example, the image supplying apparatus may transmit an optical line control instruction that indicates <disable a second optical fiber line>.

In operation 613, when the display apparatus receives the additional optical line control instruction, the display apparatus may additionally disable or enable an optical fiber line in accordance with the additional optical line control instruction.

In operations 614 and 615, the image supplying apparatus may transmit an image from an image source to the display apparatus via the optical fiber cable, and the display apparatus may receive the image via the optical fiber cable from the image supplying apparatus.

In operation 616, the display apparatus may determine whether the image source has been changed, and if changed, the display apparatus may proceed to operation 603 so as to analyze a data amount that corresponds to a changed source.

In operation 617, the image supplying apparatus may determine whether image content has been changed, and if changed, the image supplying apparatus may proceed to operation 610 so as to analyze a data amount that corresponds to the changed image content.

Figure 7:
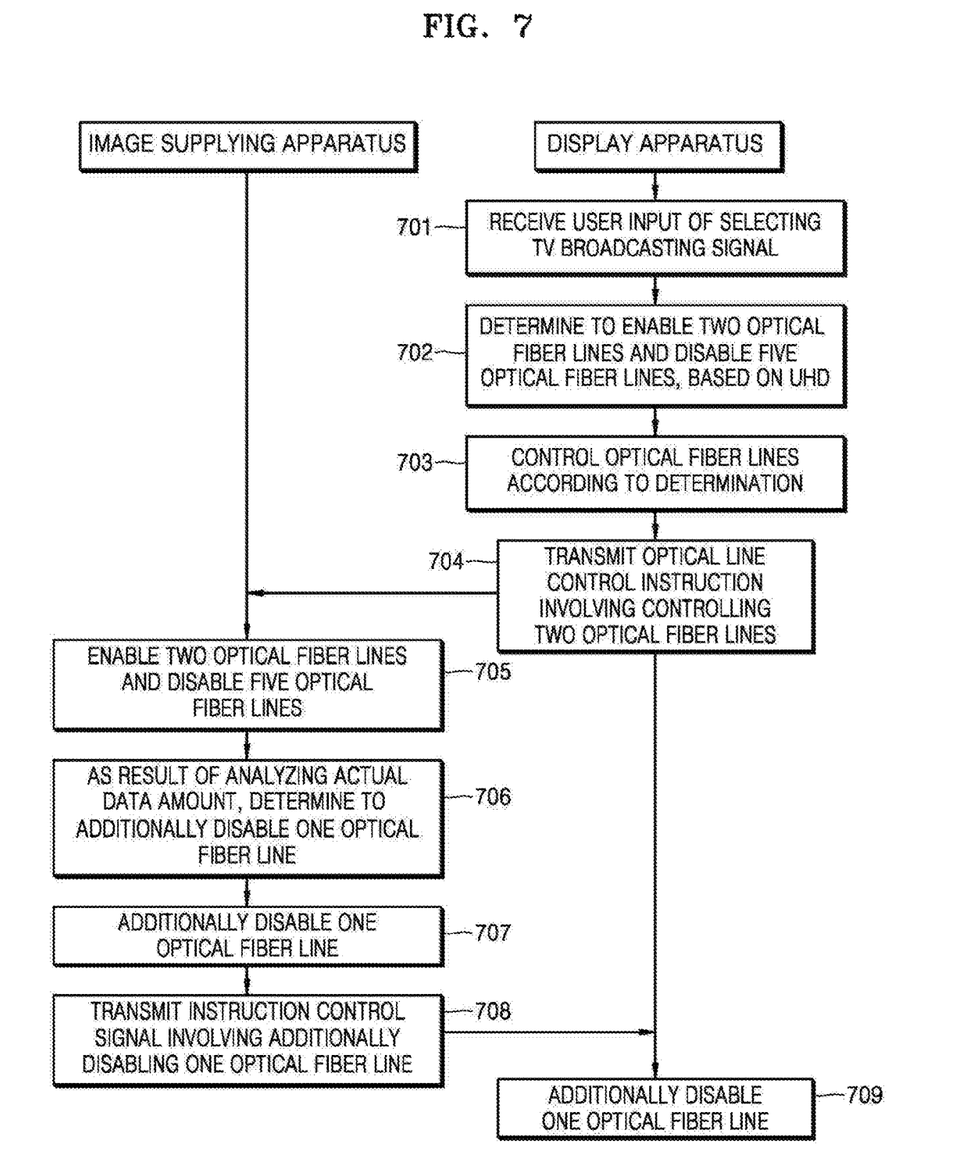
FIG. 7 is a flowchart of a scenario in which the image supplying apparatus additionally adjusts an optical fiber line enabling operation or an optical fiber line disabling operation determined by the display apparatus, according to an exemplary embodiment.

FIG. 7 is a flowchart of a scenario in which the image supplying apparatus additionally adjusts an optical fiber line enabling operation or an optical fiber line disabling operation determined by the display apparatus, according to an exemplary embodiment.

Referring to FIG. 7, in operation 701, the display apparatus may receive a user input that relates to selecting a TV broadcasting signal.

In operation 702, when the display apparatus determines that the user-selected TV broadcasting signal provides both a UHD-class signal and a HD-class signal, the display apparatus may determine a transfer-target data rate, based on UHD, which corresponds to a maximum data rate criteria. Then, the display apparatus may determine the number of optical fiber lines of an optical fiber cable that corresponds to the determined data rate. For example, the display apparatus may determine to enable two optical fiber lines and disable five optical fiber lines from among seven optical fiber lines of an optical fiber cable.

In operation 703, the display apparatus may enable two optical fiber lines and disable five optical fiber lines from among the seven optical fiber lines of the optical fiber cable.

In operation 704, the display apparatus may transmit, to the image supplying apparatus, an optical line control instruction that involves enabling two optical fiber lines and disabling five optical fiber lines.

In operation 705, the image supplying apparatus may enable two optical fiber lines and disable five optical fiber lines, in accordance with the received optical line control instruction.

In operation 706, the image supplying apparatus may monitor an amount of data that is actually being transferred. As a result of the monitoring, when the image supplying apparatus determines that UHD-class data transfer is not actually occurring, but instead, HD-class data transfer occurs, then the image supplying apparatus may determine that there is no need to use all of two optical fiber lines. Thus, the image supplying apparatus may determine to additionally disable one of the currently-enabled two optical fiber lines.

In operation 707, the image supplying apparatus may additionally disable one optical fiber line based on a result of the determination in operation 706.

In operation 708, the image supplying apparatus may transmit, to the display apparatus, an optical line control instruction that relates to additionally disabling one optical fiber line.

In operation 709, the display apparatus may receive the optical line control instruction from the image supplying apparatus, and may additionally disable one optical fiber line in accordance with the received optical line control instruction.

The determination with respect to enabling or disabling at least one optical fiber line may be triggered due to a user selection of an image source of supply, and when the image supplying apparatus or the display apparatus predicts a probability that the image source of supply may be changed, the determination may also be performed. For example, the image supplying apparatus senses that an HDMI cable is connected to an HDMI terminal at the image supplying apparatus, the image supplying apparatus may predict that a data transfer from an HDMI source is to be performed. When optical fiber lines that correspond to the data transfer from the HDMI source are pre-enabled based on the prediction, in a case where the data transfer from the HDMI source is determined and is actually performed at a later time, data may be transferred via the enabled optical fiber lines without a delay.

Figure 8:
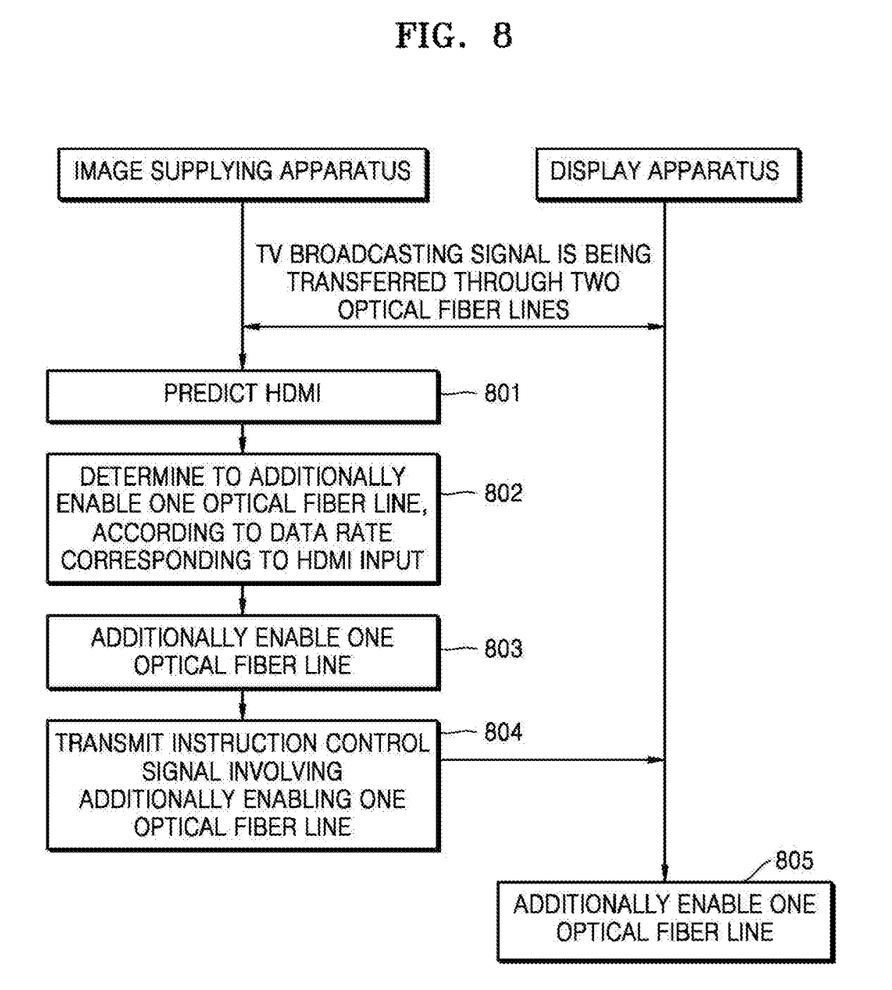
FIG. 8 illustrates a flowchart of operations of controlling optical fiber lines based on a prediction by the image supplying apparatus, according to an exemplary embodiment.

FIG. 8 illustrates a flowchart of operations of controlling optical fiber lines according to a prediction by the image supplying apparatus, according to an exemplary embodiment.

Referring to FIG. 8, it is assumed that the image supplying apparatus is transmitting a TV broadcasting signal to the display apparatus via two optical fiber lines from among optical fiber lines of an optical fiber cable.

In operation 801, the image supplying apparatus may recognize that an HDMI cable is connected to an HDMI terminal of the image supplying apparatus.

In operation 802, according to the recognition, the image supplying apparatus may predict that, even though an HDMI source has not yet been selected as an image source, the HDMI source will be selected as the image source soon. Thus, before the HDMI source is actually selected as the image source, the image supplying apparatus may cause optical fiber lines of the optical fiber cable to be enabled or disabled, the optical fiber lines being requested for the data transfer corresponding to the predicted HDMI source, so that a data delay that may occur in selection of the HDMI source may be prevented. Based on the prediction that the HDMI source may be selected as the image source of reply, the image supplying apparatus may determine to enable the optical fiber lines that are needed for a data rate that corresponds to the HDMI source. For example, the image supplying apparatus may determine to additionally enable one optical fiber line so as to satisfy the data rate requested for data transfer from the HDMI source, rather than the TV broadcasting signal that is presently being transferred.

In operation 803, the image supplying apparatus may additionally enable the determined one optical fiber line.

In operation 804, the image supplying apparatus may transmit, to the display apparatus, an optical line control instruction that relates to additionally enabling the one optical fiber line.

In operation 805, the display apparatus may receive the optical line control instruction from the image supplying apparatus, and may additionally enable the one optical fiber line in accordance with the received line control instruction.

According to the exemplary embodiments, it is possible to reduce power consumption of each apparatus, according to sources and a data amount of content exchanged between the display apparatus and the image supplying apparatus that are connected by using the optical fiber cable.

The method for operating a data transfer device according to one or more exemplary embodiments may also be embodied as programmed commands to be executed in various computer units, and then may be recorded in a non-transitory computer-readable recording medium. The non-transitory computer-readable recording medium may include one or more of the programmed commands, data files, data structures, or the like. The programmed commands recorded to the non-transitory computer-readable recording medium may be particularly designed or configured for one or more exemplary embodiments or may be well known to one of ordinary skill in the art. Examples of the non-transitory computer-readable recording medium include magnetic media including hard disks, magnetic tapes, and floppy disks, optical media including compact disk-read only memories (CD-ROMs) and digital versatile disks (DVDs), magneto-optical media including floptical disks, and hardware designed to store and execute the programmed commands in read-only memory (ROM), random access memory (RAM), a flash memory, and the like. Examples of the programmed commands include not only machine code generated by a compiler but also include a high-level programming language to be executed in a computer by using an interpreter.

While one or more exemplary embodiments have been described with reference to the figures, it will be understood by one of ordinary skill in the art that various changes in form and details may be made therein without departing from the spirit and scope as defined by the following claims. It should be understood that the exemplary embodiments described herein should be considered in a descriptive sense only and not for purposes of limitation. All available changes based on the exemplary embodiments are included in the scope of the present disclosure.

What is claimed is:

1. An electronic apparatus, which interfaces with an external apparatus through a data transfer apparatus comprising a plurality of optical fiber lines and a control circuit for enabling or disabling one or more of the plurality of optical fiber lines, the electronic apparatus comprising:

a power controller configured to transmit a control signal to the control circuit of the data transfer apparatus to control each of the plurality of optical fiber lines; and a processor configured to control an operation of the power controller; and a memory configured to store instructions which, when executed by the processor, cause the processor to:

determine a data rate for transferring data between the electronic apparatus and the external apparatus, determine a number of the optical fiber lines to be used for transferring the data based on the determined data rate, control the power controller to instruct the control circuit of the data transfer apparatus to enable the determined number of the optical fiber lines, and transmit, to the external apparatus, a first optical line control instruction indicating each of the optical fiber lines of the data transfer device to be enabled or disabled.

2. The electronic apparatus of claim 1, wherein the processor is further configured to obtain first information that relates to a supply source of the data, and to determine the data rate based on the obtained information.

3. The electronic apparatus of claim 1, wherein the processor is further configured to determine whether to enable or disable each of the optical fiber lines based on the determined data rate.

4. The electronic apparatus of claim 1, wherein the processor is further configured to transmit the first optical line control instruction to the external apparatus, via at least one from among the plurality of optical fiber lines, based on the determined data rate.

5. The electronic apparatus of claim 4, wherein:

the processor is further configured to receive a second optical line control instruction from the external apparatus, and to control the power controller to control each of the optical fiber lines based on the second optical line control instruction, and the second optical line control instruction comprises information that instructs each of the optical fiber lines with respect to whether power is to be supplied based on a data rate calculated by the external apparatus.

6. The electronic apparatus of claim 1, wherein the processor is further configured to obtain second information that relates to one from among a change of a supply source and a prediction of a change in the supply source, and to redetermine the number of the optical fiber lines to be used in performing the data transfer based on the obtained second information.

7. An electronic apparatus, which interfaces with an external apparatus through a data transfer apparatus comprising a plurality of optical fiber lines, and a control circuit to control to enable or disable the plurality of optical fiber lines, the electronic apparatus comprising:

a power controller configured to transmit a control signal to the control circuit of the data transfer apparatus to control each of the plurality of optical fiber lines;

a processor configured to control an operation of the power controller; and a memory configured to store instructions which, when executed by the processor, cause the processor to:

receive, from the external apparatus, a first optical line control instruction indicating each of the optical fiber lines of the data transfer apparatus to be enabled or disabled, and control the power controller to instruct the control circuit of the data transfer apparatus to enable a determined number of the optical fiber lines based on the received first optical line control instruction.

8. The electronic apparatus of claim 7, wherein the processor is further configured to:

determine a data rate requested for the data transfer between the electronic apparatus and the external apparatus, and control the power controller to determine whether to change a current state of enablement or disablement for each of the optical fiber lines, based on the determined data rate, and to enable or disable each of the optical fiber lines based on a result of determining whether to change the current state of enablement or disablement.

9. The electronic apparatus of claim 8, wherein the processor is further configured to transmit, to the external apparatus via the data transfer apparatus, a second optical line control instruction based on a result of determining whether to change the current state of enablement or disablement.

10. A method for operating an electronic apparatus, which interfaces with an external apparatus through a data transfer apparatus comprising a plurality of optical fiber lines, and a control circuit enabling or disabling one or more of the plurality of optical fiber lines, the method comprising:

determining a data rate for transferring data between the electronic apparatus and the external apparatus, determining a number of the optical fiber lines to be used for transferring the data based on the determined data rate, controlling a power controller to instruct the control circuit of the data transfer apparatus to enable the determined number of the optical fiber lines, and transmit, to the external apparatus, a first optical line control instruction indicating each of the optical fiber lines of the data transfer device to be enabled or disabled.

11. The method of claim 10, further comprising:

obtaining first information that relates to a supply source of the data, and determining the data rate based on the obtained information.

12. The method of claim 10, further comprising determining whether to enable or disable each of the optical fiber lines based on the determined data rate.

13. The method of claim 10, further comprising transmitting the first optical line control instruction to the external apparatus via at least one from among the plurality of optical fiber lines based on the determined data rate.

14. The method of claim 13, further comprising receiving a second optical line control instruction from the external apparatus, and controlling each of the optical fiber lines based on the second optical line control instruction, and wherein the second optical line control instruction comprises information that instructs each of the optical fiber lines with respect to whether power is to be supplied based on a data rate calculated by the external apparatus.

15. The method of claim 10, further comprising:

obtaining second information that relates to one from among a change of a supply source and a prediction of a change in the supply source, and redetermining the number of the optical fiber lines to be used in performing the data transfer based on the obtained second information.

* * * * *